United States Patent [19]
Funaki et al.

[11] Patent Number: 6,054,507
[45] Date of Patent: Apr. 25, 2000

[54] METAL-ORGANIC POLYMER COMPOSITE STRUCTURE AND PRODUCTION THEREOF

[75] Inventors: Yoshinori Funaki, Himeji; Kiyoharu Tsutsumi, Nara; Takeji Hashimoto, Kyoto; Masafumi Harada, Nara, all of Japan

[73] Assignee: Japan Science and Technology Corporation, Honcho, Japan

[21] Appl. No.: 09/037,563

[22] Filed: Mar. 9, 1998

[30] Foreign Application Priority Data

| Mar. 10, 1997 | [JP] | Japan | 9-055234 |
| May 29, 1997 | [JP] | Japan | 9-140193 |
| Aug. 22, 1997 | [JP] | Japan | 9-241872 |
| Aug. 22, 1997 | [JP] | Japan | 9-241873 |

[51] Int. Cl.[7] .............. B01J 31/06; B01J 31/28; B05D 7/14; C08K 9/10; C08K 3/08
[52] U.S. Cl. .............. 523/210; 502/5; 502/159; 502/173; 523/205; 524/439; 524/440
[58] Field of Search .............. 502/5, 159, 173; 524/440, 439; 523/205, 210; 427/216, 221

[56] References Cited

U.S. PATENT DOCUMENTS

| 4,252,677 | 2/1981 | Smith | 502/159 |
| 5,234,758 | 8/1993 | Olsen et al. | 524/440 |

OTHER PUBLICATIONS

Antonietti M: "Synthesis and Characterization of Noble Metal Colloids in Block Copolymer Micelle**", Advanced Materials, vol. 7, No. 12, Dec. 1, 1995, pp. 1000–1005, XP000547224.

R. Saito et al.: "Introduction of colloidal silver into the poly(2–vinylpyridine) microdomain of microphase–separated poly(styrene–b–2–vinylpyridine) film. One step method." Polymer, vol. 36, No. 21, 1995, pp. 4119–4124, XP002064963.

*Primary Examiner*—Peter A. Szekely
*Attorney, Agent, or Firm*—Fay, Sharpe, Fagan, Minnich & McKee, LLP

[57] ABSTRACT

There are disclosed a metal-organic polymer composite structure, particularly a porous metal-organic polymer composite structure, for use as functional materials such as catalysts, and a method for producing the structure. The composite structure is composed of a microphase-separated structure from a block copolymer in which a metalphilic polymer chain and a metalphobic polymer chain are bonded together at each end, and ultrafine metal particles are contained in the metalphilic polymer phase of the microphase-separated structure.

9 Claims, 4 Drawing Sheets

(A)

(B)

METAL-ORGANIC POLYMER COMPOSITE STRUCTURE AND PRODUCTION THEREOF

BACKGROUND OF THE INVENTION

1. Field of the Invention

The present invention relates to a novel metal-organic polymer composite structure, particularly a porous metal-organic polymer composite structure, which can be utilized as functional materials such as catalysts, fixed catalysts, membrane reactors, antistatic plastics and other applications, and a method for producing the same.

2. Prior Art

Ultrafine metal particles including noble metal particles are widely used as catalysts, and it is known that the smaller the particle size is, the higher the catalyst activity per unit weight is. In this case, since an ultrafine metal particle having a particle size of nm order tends to coagulate due to bonding of metal atoms on its surface and it is difficult for the particle to exist in stable manner without any treatment, protection and stabilization using a surfactant and a polymer such as poly(N-vinyl-2-pyrrolidone), poly(2-vinylpyridine) and the like have been tried (Mathias Brust et al., J. Chem. Soc., Chem. Commun., 801, 1994; Naoki Toshima et. al., Chemistry Letters, 1245, 1985). Since ultrafine metal particles thus obtained are usually in a uniform solution, separation from a reaction product is difficult when the particles are used as a catalyst, and for industrial use, a support such as silica gel, polymer or the like is desired. Therefore, it is preferable that the support is composed of a microporous material having a large specific surface area, and consequently, inorganic materials such as silica gel, activated carbon, alumina and the like have been hitherto used. However, these inorganic materials have problems in molding properties and processing properties since they are powders themselves, and for use as a film or membrane, a support by a polymer is required.

Typical examples of methods for producing a microporous film composed of a polymer include the following.

(1) Japanese Patent Application Laid-Open (JPA) No. 1,739/1989

Described is a method for producing a porous material by microphase separation of a block copolymer composed of a styrene derivative and a conjugated diene or acrylate derivative, and by hydrolysis and treatment of the conjugated diene or acrylate derivative with plasma containing oxygen.

(2) JPA No. 279,741/1990

Described is a method in which a mixture of a first polymer having an ionic-bonding functional group on each end of the polymer and a second polymer having a functional group on each end capable of bonding to the aforesaid functional group of the first polymer is subjected to a solution casting, one phase of the microphase-separated structure formed in the resulting film is treated with a base or acid to cut the bonding of the block copolymer, and the treated phase is extracted with a solvent.

(3) JPA No. 287,084/1993

Described is method for producing a porous film having a pore size of several hundreds nm which has expectantly the possibility as a carrier for a catalyst. This method is characterized in that the film has a bicontinuous structure of various microphase-separated structures to be formed by a block copolymer, one component is decomposed or eluted, and the pore size distribution is very narrow due to the bicontinuous structure.

As for fixing ultrafine metal particles on such a support, although physical adsorption on the surface of the support is most simple, the supported ultrafine metal particles tend to flow out of the system in such method.

For preventing it, ultrafine metal particles are preferably fixed on the support through some chemical bond. As a specific method for chemically fixing ultrafine metal particles, there has been reported a method in which a support obtained by modification with imino diacetate on the surface of a copolymer of styrene and divinylbenzene is used, and then palladium ions are reduced in a water/methanol mixed solution to form palladium fine particles on the support (H. Hirai, S. Komatuzaki, and N. Toshima; Bull. Chem. Soc. Jpn., 57, 488–494, 1984). While a number of methods are thus known for ultrafine metal particles supported on the surface of a polymer, from the viewpoint of stability of ultrafine metal particles on support, supported particle inside the support is more preferable than that on the support.

As methods for introducing ultrafine metal particles inside a polymer, there are known, for example, a method in which poly(2-vinylpyridine) phase of a poly(2-vinylpyridine) poly-styrene block copolymer is crosslinked with 1,4-diiodobutane, then, fine crystals of silver iodide are deposited therein, and the crystals are reduced by photoreduction so as to form ultrafine silver particles (R. Saito, S. Okamura and K. Ishizu, Polymer, 1993, 34–6, 1189). A method is also known in which a palladium (II) acetylacetonate complex is dissolved in a methacrylic acid monomer, polymerized and solidified with benzoyl peroxide. Then, the solidified substance is heated to form ultrafine metal particles (Y. Nakao, Kobunshi, 43, December, pp 852–855, 1994). However, the former is a peculiar method utilizing the photoreduction of silver halide fine crystal, and therefore, this method can not be generally applied to a wide range of metals including noble metals such as platinum, palladium and rhodium useful as a catalyst and other applications. The latter method, based on a synthesizing and crosslinking reaction of a homopolymer, is also inappropriate because it cannot form a porous material to be used as a catalyst and other applications.

SUMMARY OF THE INVENTION

The present invention solves the above-described problems in the conventional art, by providing a novel type of metal-organic polymer composite structure, particularly a porous metal-organic polymer composite structure, in which ultrafine metal particles are contained and maintained (embedded) in a block copolymer phase, not by providing a metal-organic polymer composite in which ultrafine metal particles are attached simply on the surface of porous support (the void wall surface) as in the above-described prior art.

More specifically, according to an embodiment of the present invention, a metal-organic polymer complex is prepared beforehand in which the outer surface of an ultrafine metal particle is coated (protectively coated) with a polymer (homopolymer) which is compatible with a polymer forming a matrix. The metal-organic polymer complex is then mixed with a block copolymer containing a polymer chain which is to form the support (the matrix). The formation of a phase-separated structure (microphase-separated structure) from the block copolymer results in a metal-organic polymer composite structure in which ultrafine metal particles are contained in a phase of the microphase-separated structure. Further, from such metal-organic polymer composite structure (particularly the one having a bicontinuous structure), a porous structure can be obtained by eluting or decomposing the phase not containing the metal.

While the present invention thus provides a novel metal-organic polymer composite structure, particularly a porous composite structure, in which ultrafine metal particles are contained in a polymer phase, it has been found by observing this structure with a microscope that the ultrafine metal particles are located deeply inside the matrix polymer forming a network. Therefore, for example, when this metal-organic polymer composite structure, particularly a porous structure, is used as a catalyst, it is required that the reactants should invade deeply inside the matrix polymer, and the catalytic activity may not be fully manifested.

This disadvantage that "the distance between the surface of the polymer skeleton and the ultrafine metal particle is long" is solved, according to a preferred embodiment of the present invention, by preparing beforehand ultrafine metal particles coated with a specific block copolymer and introducing them into a microphase-separated structure of a matrix polymer. More specifically, a metal-organic polymer complex is prepared in which an ultrafine metal particle is coated with a block copolymer (not with the homopolymer as described above) composed of a metalphilic polymer chain and a metalphohbic polymer chain, and by using this complex, the ultrafine metal particles are introduced and contained in a phase of a microphase-separated structure formed from a block copolymer which has compatibility with the polymer chain (which has coated the ultrafine metal particles) and is to form a matrix (a support). Thus, according to the present invention, there is obtained a structure (particularly, a porous structure) in which ultrafine metal particles are located near the surface (boundary) of the matrix polymer skeleton.

Furthermore, in the above-described method for forming a microphase-separated structure using a metal-organic polymer complex in which an ultrafine metal particle is coated with a non-water-soluble organic polymer (which is a homopolymer), the skeleton is disturbed and a microphase separation into "a domain in which ultrafine metal particles are condensed" and "a polymer skeleton domain in which ultrafine metal particles are contained only in a slight amount" occurs when the ultrafine metal particle content is increased. It is therefore difficult to introduce the ultrafine metal particles into the polymer skeleton matrix in an amount of 1% or more by weight. Furthermore, since the ultrafine metal particles are located inside the matrix polymer skeleton, the reactants should invade deeply into the polymer skeleton, and consequently the catalytic activity decreases when the structure is made into a porous material and used as a catalyst.

Such problems that "(1) the ultrafine metal particle content is low" and "(2) the distance between the surface of the polymer skeleton and the surface of the ultrafine metal particle is long" are also solved, according to another preferred embodiment of the present invention, by using a metal-organic polymer complex in which the surface of an ultrafine metal particle is protectively coated with a block copolymer (namely, not with a homopolymer) in which a metalphilic polymer chain and a metalphohbic polymer chain are bonded together at each end. More specifically, taking advantage of a microphase-separated structure obtained directly from such complex, it becomes possible to produce a metal-organic polymer composite structure and a porous metal-organic polymer composite structure having a remarkably high metal content.

Thus, according to the present invention, there is provided a metal-organic polymer composite structure comprising a microphase-separated structure from a block copolymer in which a metalphilic polymer chain and a metalphobic polymer chain (which are incompatible with each other) are bonded together at each end, wherein ultrafine metal particles are contained in the metalphilic polymer phase of the microphase-separated structure. In the metal-organic polymer composite structure of the present invention the metalphobic polymer phase is subjected to pore formation to form a porous structure.

In a preferred embodiment of the metal-organic polymer composite structure of the present invention, the ultrafine metal particles are located near the skeleton surface (boundary) of the metalphilic polymer phase of the microphase-separated structure.

In another preferred embodiment of the metal-organic polymer composite structure of the present invention, the ultrafine metal particles are contained in the metalphilic polymer phase in an amount of 1% or more by weight, and they can also be contained even in an amount of 10% or more by weight.

The microphase-separated structure in the structure of the present invention is preferably of a bicontinuous structure. The ultrafine metal particles contained in the structure of the present invention usually have a particle size of 10 nm or less.

In another aspect of the present invention, there is provided a method for producing the above-described metal-organic polymer composite structure comprising the steps of i) dissolving a non-water-soluble organic polymer, a solvent-soluble metal compound and a reducing agent in an organic solvent, and then heating the resultant solution for reduction at 50 to 120° C. to produce a metal-organic polymer complex in which an ultrafine metal particle is coated with the non-water-soluble organic polymer, and ii) producing a solution or a melt in which the above-described metal-organic polymer complex and a matrix block copolymer compatible with this complex are randomly mixed (i.e. in a disordered state), and forming a microphase-separated structure from the matrix block copolymer by a solvent casting or a decrease in temperature, respectively, thereby introducing the ultrafine metal particles into the polymer phase.

The method of the present invention usually comprises, after the formation of the microphase-separated structure, the step of iii) removing the metalphobic polymer phase from the microphase-separated structure for pore formation, so as to obtain a porous metal-organic polymer composite structure. In a preferred embodiment of the present invention, there is used a block copolymer, as the non-water-soluble organic polymer, in which a metalphilic polymer chain and a metalphobic polymer chain (which are incompatible with each other) are bonded together at each end, to consequently obtain a metal-organic polymer composite structure in which metal particles are located near the skeleton surface (boundary) of the polymer phase.

The present invention also provides a method for producing the above-described metal-organic polymer composite structure, comprising the steps of i) dissolving a block copolymer in which a metalphilic polymer chain and a metalphobic polymer chain are bonded together at each end, a solvent-soluble metal compound and a reducing agent in an organic solvent, and then heating the resultant solution for reduction at 50 to 120° C. to produce a metal-organic polymer complex in which the surface of an ultrafine metal particle is coated with the block copolymer, and ii) producing a solution or a melt in which the above-described metal-organic polymer complex is randomly mixed (i.e. in a disordered state), and forming a microphase-separated structure from the metal-organic polymer complex by a solvent casting or a decrease in temperature, respectively.

The method of the present invention usually comprises, after the formation of the microphase-separated structure, the step of iii) removing the metalphobic polymer phase from the microphase separated structure for pore formation, so as to obtain a porous metal-organic polymer composite structure. This method of the present invention is suitable for obtaining a metal-organic polymer composite structure having a particularly high amount of ultrafine metal particles.

In further aspect of the present invention, there is provided a metal-organic polymer complex in which an ultrafine metal particle (metal cluster) is coated with a non-water-soluble organic polymer. As such metal-organic polymer complex is preferred a complex in which the non-water-soluble organic polymer is a block copolymer in which a metalphilic polymer chain and a metalphobic polymer chain (which are incompatible with each other) are bonded together at each end. Such metal-organic polymer composite is used for producing the metal-organic polymer composite structure of the present invention, and further, is useful itself in various applications.

The present invention further provides a method for producing the above-described metal-organic polymer complex, comprising the step of dissolving a non-water-soluble organic polymer, a solvent-soluble metal compound and a reducing agent in an organic solvent, and then heating the solution for reduction at 50 to 120° C.

DETAILED DESCRIPTION OF THE INVENTION

Figure 1:
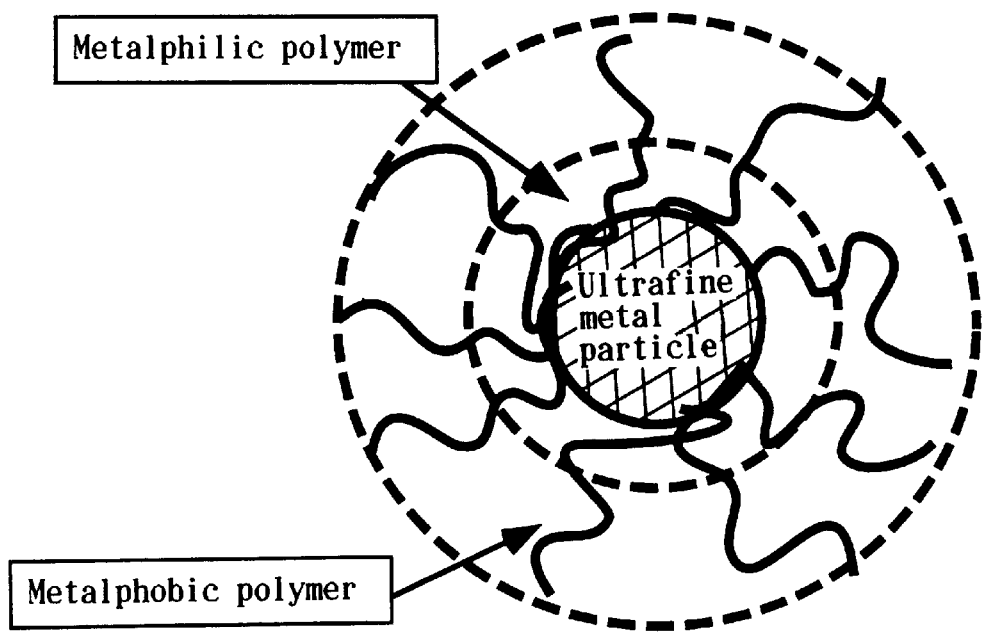
FIG. 1 is a schematic model representing the structure of an ultrafine metal particle-block copolymer complex formed in a micelle, as is conventionally known.

While the present invention provides a novel metal-organic polymer composite structure, particularly a porous metal-organic polymer composite structure, by utilizing a metal-organic polymer complex (organic polymer-protected metal cluster) in which an ultrafine metal particle (metal cluster) is coated with a non-water-soluble organic polymer, such metal-organic polymer complex itself is also useful as a catalyst, a non-linear optical material, an electroconductive plastic, an antistatic material, a plastic filler and other applications.

As described in the beginning, in order to stabilize ultrafine metal particles having a small particle size without coagulating each other for use as a catalyst and other applications, the following examples of metal clusters protected by a polymer have been hitherto known.

(1) Metal clusters protected with a water-soluble polymer (Naoki Toshima et. al., Z. Naturforsch, 50a, 283, 1995):

Described is a method in which a noble metal salt such as palladium chloride, hexachloroplatinic acid and the like is used together with poly(N-vinyl-2-pyrrolidone) to prepare an aqueous solution, and the solution is subjected to reduction by alcohol to form metal clusters protected with poly(N-vinyl-2-pyrrolidone). The metal clusters thus formed are water-soluble. However, most of synthetic polymers which are industrially used are non-water-soluble, such as even polymers having a relatively high polarity such as poly(methyl methacrylate), polyvinylpyrrolidine and the like, not to mention non-polar polymers such as polystyrene, polybutadiene, polyisoprene and the like. Therefore, there is a problem that uniform colloidal dispersion in these synthetic polymers can not be formed by using metal clusters protected with such a water-soluble polymer.

(2) Cluster formation by reduction of a metal salt in a micellar polymer formed in an organic solvent (Markus Antonietti et. al., Advanced Materials, 1000, 7, No. 12, 1995):

A micelle in which a metal salt is contained in an organic solvent is formed by vigorously mixing an aqueous solution of the metal salt such as chloroauric acid with a block copolymer composed of polystyrene and polyvinylpyridine in a toluene/tetrahydrofuran mixed solution. Reaction with a reducing agent such as $NaBH_4$ and $N_2H_4$ results in the formation of metal cluster stabilized in the micelle. However, since the cluster is formed inside the polymer micelle in this method, the size of the cluster depends on such factors as the size of the micelle and the stoichiometrical relation between the metal salt and the metal bonding sites. This method therefore suffers a drawback that the control of the cluster size is difficult.

Thus, no conventional techniques have realized a polymer-protected metal cluster in which the metal cluster exists in a stable manner, the control of the cluster size is easy, and the dispersion for use in a wide range of polymers is also possible.

The present invention therefore provides a polymer-protected metal cluster which has a wide range of applications including easy introduction into various polymers, due to solubility in various organic solvents, as well as a method for producing such protected cluster. The present invention has solved the problems of the prior art as described above, and it becomes possible to form a protected metal cluster having a particle size of 10 nm or less where the size distribution is narrow and even the size control of the particle is easy.

For producing a metal-organic polymer composite structure (including a porous structure) according to the present invention, it is particularly preferable to use a complex in which the surface of an ultrafine metal particle is coated with a block copolymer (block copolymer in which a metalphilic polymer chain and a metalphobic polymer chain are bonded together at each end) as the metal-organic polymer complex (organic polymer-protected metal cluster). By this way, there can be obtained a composite structure (particularly a porous composite structure) in which ultrafine metal particles are near the skeleton of a matrix polymer, and also a composite structure (particularly a porous composite structure) containing a remarkably high amount of metal. These advantages can be accounted for as follows.

As a complex in which an ultrafine metal particle is coated (protectively coated) with a polymer, there has been hitherto known a complex in which an ultrafine metal particle is coated with a polymer for stabilization by reduction reaction in a polymer micelle. (Markus Antonietti et. al., Advanced Materials, 1000, 7, No. 12, 1995), as described above. By such method, however, the complex in which the ultrafine metal particle is coated with the polymer (even if the polymer is a block copolymer) forms a concentric multi-layer structure (see FIG. 1).

Figure 2:
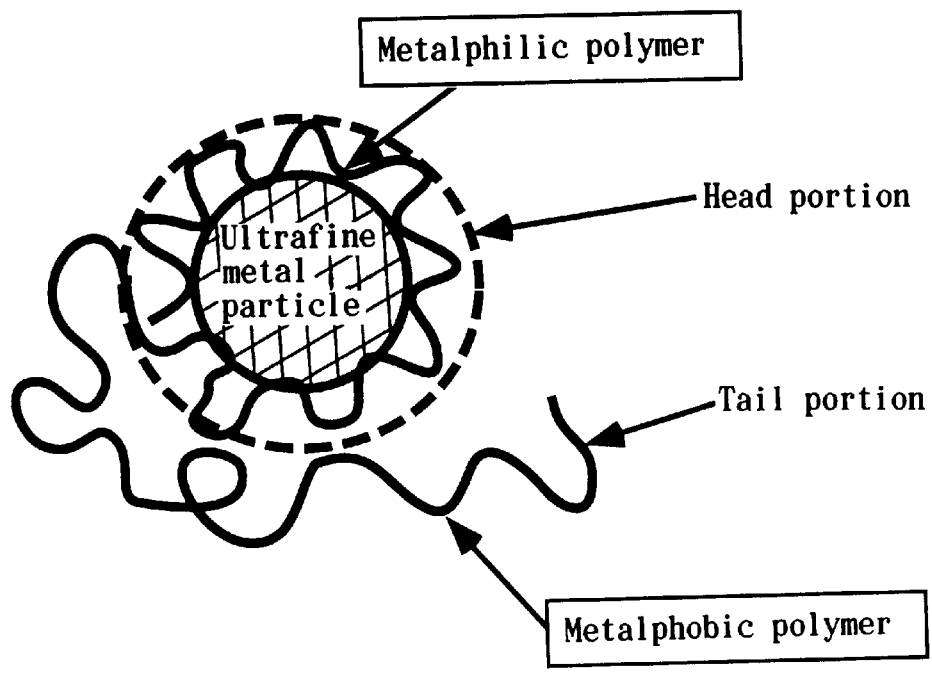
FIG. 2 is a schematic model representing the structure of a metal-organic polymer complex in which an ultrafine metal particle is protectively coated with a block copolymer, according to a preferred embodiment of the present invention.

On the other hand, in the method of the present invention, it is considered as described below that an ultrafine metal particle is coated and stabilized basically by one polymer molecule since the ultrafine metal particle is formed is within a space defined by the polymer molecule present in the form of solution. Therefore, when a block copolymer in which "a metalphilic polymer chain" and "a metalphobic polymer chain" are bonded together at each end is used, only "the metalphilic polymer chain" will presumably coat the ultrafine metal particle so as to form "the head of the metal-organic polymer complex", and "the metalphobic polymer chain" is bonded to this head at its end to form "the tail of the metal-organic polymer complex" (The schematic model is shown in FIG. 2) Therefore, an ultrafine metal particle coated even with a block copolymer is not suitable for the metal-organic polymer complex to be used in the present invention (if it is formed in a micelle of such block copolymer), since the outer shell of the particle is coated with the same kind of polymer (which is incompatible with metal).

The "metal-organic polymer complex" to be used in the present invention is thus expectantly constituted of "the head portion" and "the tail portion" and the respective portions will possibly tend to to be introduced into the corresponding phases compatible with the respective polymers. However, since "the head portion" and "the tail portion" are chemically bonded, the complex can not be embedded deeply into the corresponding phases, and consequently there can be obtained a structure in which the metal is located near the boundary of the polymer phase skeleton of the phase-separated structure. A porous structure can be obtained by decomposing one of the polymer phases.

Figure 3:
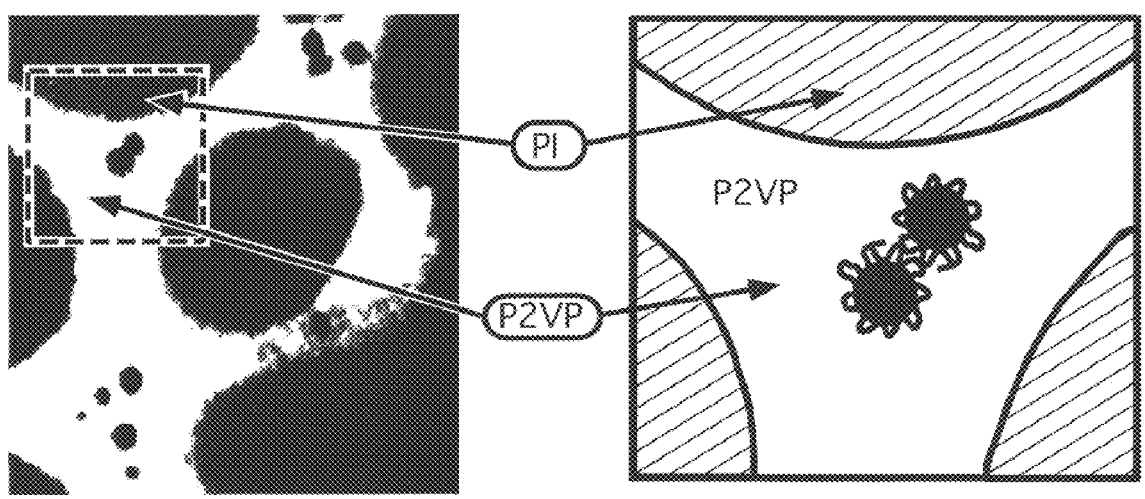
FIG. 3 shows a transmission electron microphotograph (left) and a schematic model thereof (right), both representing the structure of a metal-organic polymer composite structure obtained by using a matrix polymer and a metal-organic polymer complex in which an ultrafine metal particle is coated with a homopolymer.
Figure 4:
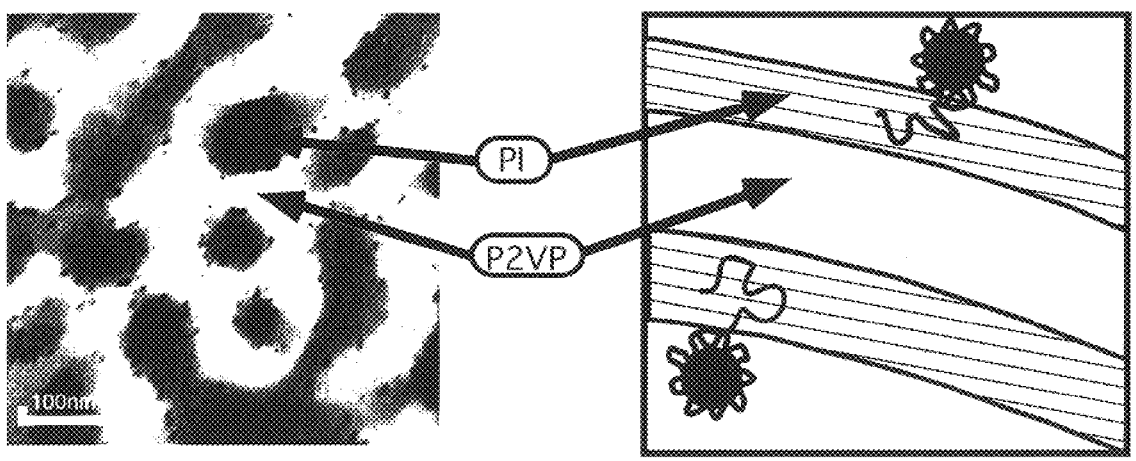
FIG. 4 shows a transmission electron microphotograph (left) and a schematic model thereof (right), both representing the structure of a metal-organic polymer composite structure obtained by using a matrix polymer and a metal-organic polymer complex in which an ultrafine metal particle is coated with a block copolymer according to a preferred embodiment of the present invention.

Such a feature of the present invention has actually been substantiated by observing the resulting metal-organic polymer composite structure or the porous metal-organic polymer with a microscope. FIG. 3 shows a transmission electron microphotograph (left) and its schematic picture representing the photograph (right) of a structure of the present invention. The structure is obtained by introducing ultrafine metal particles (ultrafine Pd particles) coated with poly(2-vinylpyridine) (P2VP) (homopolymer) into a microphase-separated structure from a block copolymer (P2VP-b-PI) composed of poly(2-vinylpyridine) (P2VP) and polyisoprene (PI). In the photograph and the figure, the black dots indicate ultrafine metal particles, and a porous structure is obtained by decomposing the blackish phase (PI phase) to be a pore (This remark applies to FIG. 4 to be described below). From the FIG. 3, it is seen that the ultrafine metal particles are located deeply inside and around the center of the P2VP phase. On the other hand, FIG. 4 shows a transmission electron microphotograph (left) and its schematic picture (right), representing the structure composed of a microphase-separated structure from P2VP-b-PI into which ultrafine Pd particles coated with P2VP-b-PI (block copolymer) is introduced, according to a preferred embodiment of the present invention. It is seen that the ultrafine metal particles (Pd) are located near the skeleton boundory of the P2VP phase.

Thus, according to the present invention, there can be obtained a porous material useful, for example, as a membrane reactor and a highly active catalyst which is easily contacted with a reactant, with supporting ultrafine metal particles strongly on a support (polymer).

Further, the metal-organic polymer complex to be used in the present invention, in which an ultrafine metal particle (metal cluster) is protectively coated with a block copolymer (block copolymer in which a metalphilic polymer chain and a metalphobic polymer chain are bonded together at each end), is itself a kind of supermolecule, and it can be considered as a huge surfactant or a block copolymer molecule within which a metal particle is contained. Therefore, the metal-organic polymer complex itself can form a microphase-separated structure, and from such microphase-separated structure a metal-organic polymer composite structure and a porous metal-organic polymer composite structure can be produced even without using a matrix polymer. Furthermore, since ultrafine metal particles are contained from the beginning, a metal-organic polymer composite structure and a porous metal-organic polymer composite structure derived from the microphase-separated structure is considered to contain a high amount of the ultrafine metal particles.

Figure 5:
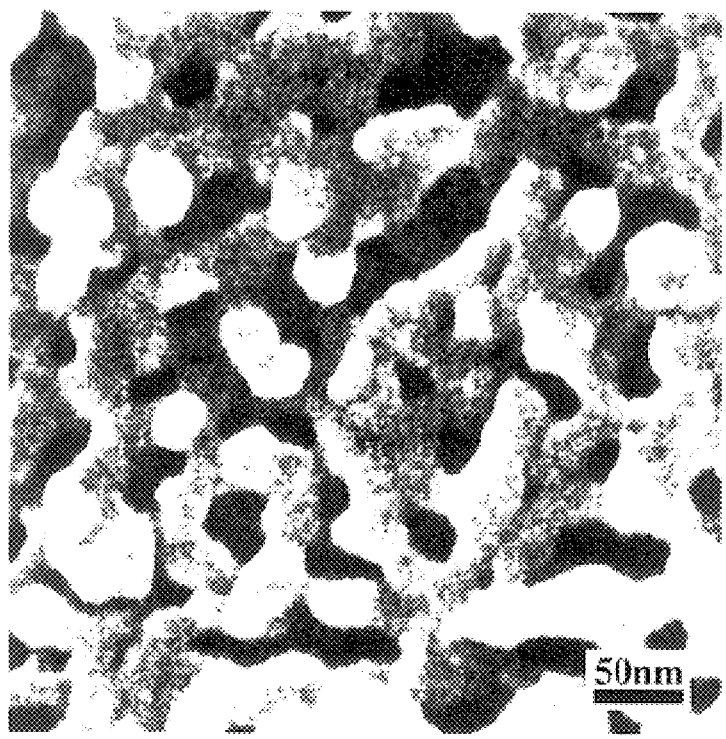
FIG. 5 shows a scanning electron microphotograph (A) and a transmission electron microphotograph (B), representing the structure of a porous metal-organic polymer composite structure containing a high amount of metal obtained by using only a metal-organic polymer complex in which an ultrafine metal particle is coated with a block copolymer according to a preferred embodiment of the present invention.
Figure 5:
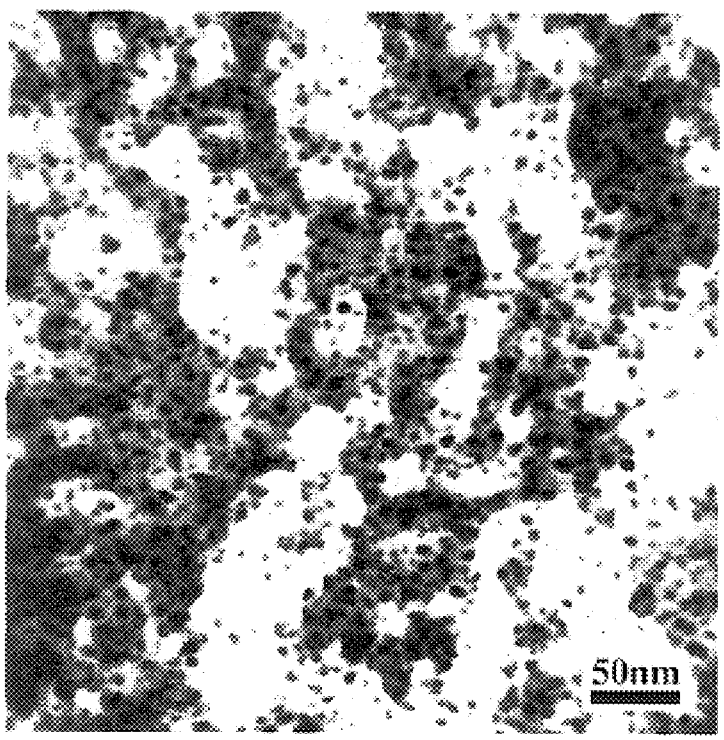

Such a feature has actually been substantiated by observing the resulting metal-organic polymer composite structure and porous metal-organic composite structure with a microphotograph. FIG. 5 shows a scanning electron microphotograph representing the surface image (A) and a transmission electron microphotograph revealing the internal image (B) of one example of the porous metal-organic polymer composite structure obtained according to the present invention. It is seen from FIG. 5 that, in the porous structure of the present invention, a continuous fine pore (the black domain in A represents a pore region formed by the removal of metalphobic polymer phase (polyisoprene phase)) is formed, and a remarkably high amount of ultrafine metal particles (ultrafine Pd particles in this case : black dots represented in B) are uniformly dispersed therein.

Thus., according to the present invention, ultrafine metal particles can be contained in an amount of 1% or more by weight which has been impossible in the conventional structures or porous materials using a metal-organic polymer complex. Furthermore, the ultrafine metal particles can be introduced even in an amount of 10% or more by weight which is effective in the case of practical use as a catalyst and other applications. Even 50 to 60% by weight of ultrafine metal particles can be introduced if necessary.

The metal-organic polymer composite structure and porous metal-organic polymer composite structure of the present invention will be described in detail below referring to the respective constituent components and steps for the production thereof.

(1) Preparation of Metal-Organic Polymer Complex

For preparing the metal-organic polymer complex according to the present invention, a non-water-soluble organic polymer (homopolymer or block copolymer), a solvent-soluble metal compound and a reducing agent are dissolved in an organic solvent (a common excellent solvent for these components), to prepare a solution in which the respective components are dispersed in molecular level. Then, the solution is heated for reduction to prepare a metal-organic polymer complex in which the surface of the ultrafine metal particle is coated (protectively coated) with the block copolymer or the homopolymer, and the complex is purified by such means as super-centrifugal separation.

The temperature for the heating for reduction is usually in the range of from about 50 to 120° C., and the heating time is in the range of from approximately 5 to 50 hours. As an organic solvent, various compounds can be used, which may be selected for use from hydrocarbons, aromatic hydrocarbons, halogen compounds, ether compounds, amide compounds, sulfoxide compounds and so on.

(i) Block Copolymer for Coating Metal

For producing a metal-organic polymer composite structure (particularly a porous metal-organic polymer composite structure) in which ultrafine metal particles are located near skeleton boundary of a polymer phase or a metal-organic polymer composite structure (particularly a porous metal-organic polymer composite structure) in which a high amount of ultrafine metal particles are contained in a polymer phase according to the preferred embodiments of the present invention, a metal-organic polymer complex is used in which the surface of an ultrafine metal particle (metal cluster) is coated with a block copolymer. This block copolymer is not particularly limited, providing it is constituted of a metalphilic block chain (polymer chain) and another block chain (polymer chain) incompatible with the metalphilic polymer.

As a polymer for constituting the metalphilic block chain, there can be exemplified by a polymer composed of a monomer unit having a nitrogen atom such as poly(2-vinylpyridine), polyaminostyrene and the like; a polymer composed of a monomer unit having an oxygen atom such as poly(methyl methacrylate) and the like; a polymer composed of a monomer unit containing sulfur such as poly (propylene sulfide). Any polymer is permissible providing it has basically affinity with metals or metal ions. A block copolymer or a random copolymer, which is obtained from a metal coordinated polymer by propagating other monomer units from the end of the polymer by living polymerization and the like, can be used. The number average molecular weight (Mn) of the metalphilic polymer chain may be from 1000 to 1000000, and preferably from 5000 to 500000. It is more preferable from 10000 to 100000 in view of the easiness for synthesis of a polymer and the stability of the resultant protected cluster (metal-organic polymer complex).

The other polymer chain (polymer for constituting a phase which is to finally form a pore) of the block copolymer is not basically limited providing it is "incompatible with an ultrafine metal particle protected with a metalphilic polymer". In a case where a pore is formed in the structure, a polymer which can be decomposed is preferred as will be described below.

The number of blocks in the block copolymer is not particularly limited. When a metal-organic polymer composite structure or porous metal-organic polymer composite structure containing a high amount of ultrafine metal particles is to be produced by the direct microphase separation from the block copolymer, an A-B type diblock copolymer or an A-B-A type triblock copolymer which tends to form a bicontinuous structure as the microphase-separated structure is preferred.

(ii) Homopolymer for Coating Metal

While for obtaining the metal-organic polymer composite structure or porous metal-organic polymer composite structure of the present invention, the metal-organic polymer complex coated with the block copolymer as described above (i) is preferably used, a metal-organic polymer complex coated with a homopolymer can also be used. As the homopolymer, there can be used such a polymer as has been described in (i) for constituting a metalphilic block chain.

(iii) Metal for Constituting the Complex

As a metal for constituting the metal-organic polymer complex coated with a block copolymer (or a homopolymer) of the present invention, various metals can be applied. Examples of usable metals include transition metals, for example, metals of the group VIII, particularly various noble metals. In preparing the complex, the metal is dissolved as a solvent-soluble metal compound (represented by a salt or a complex thereof) in an organic solvent together with a copolymer (or a homopolymer) and a reducing agent.

Thus, according to the present invention, there can be obtained a metal-organic polymer complex in which the metal particle size is extremely small, i.e. 10 nm or less (usually several nm) and the particle size is uniform. This is because a reaction system for preparing an ultrafine metal particle protectively coated with a copolymer (or a homopolymer) is a uniform organic solvent system.

(iv) Reducing Agent

As the reducing agent, various compounds such as alcohols, saccharides, ascorbic acid, hydrogen gas, hydrazine, boron hydride and the like can be used.

While the ratio of a block copolymer, a soluble metal compound, a reducing agent and a solvent to be used for producing the metal-organic polymer complex coated with a block copolymer (or a homopolymer) depends on an aimed complex, the general standard thereof is as follows.

Soluble compound/monomeric unit of copolymer (or homopolymer)=1/4 to 1/50 (molar ratio)

Reducing agent/soluble compound=1/10 to 1/10000 (large excess)(molar ratio)

Copolymer (or homopolymer)/solvent=1/1000 to 1/10 (volume ratio)

(2) Matrix Polymer

In one embodiment, the metal-organic polymer composite structure of the present invention is obtained by forming a microphase-separated structure as described below from randomly mixed condition composed of a metal-organic polymer complex and a matrix polymer which is compatible with the complex, thereby introducing ultrafine metal particles into one polymer phase.

As the matrix polymer into which ultrafine metal particles are to be introduced, there is used a block copolymer which is compatible with the above described "metal-organic polymer complex" in which an ultrafine metal particle is coated with a copolymer, namely, a block copolymer in which a polymer chain which is compatible with "the head portion of the metal-organic polymer complex" and a polymer chain compatible with "the tail portion of the metal-organic polymer complex" are bonded together at each end. Therefore, these polymer chains in the block copolymer for matrix are incompatible with each other. Such a block copolymer for matrix can be used, even if a metal-organic polymer complex in which an ultrafine metal particle is coated with a homopolymer (non-water-soluble organic polymer) is used as "the metal-organic polymer complex", since a polymer chain which is compatible with the homopolymer (a polymer chain which is compatible with the head portion) is contained. The number of blocks of this block copolymer is not particularly limited, and an A-B type diblock copolymer or an A-B-A type triblock copolymer which tends to form a bicontinuous structure is preferred. Requirements for this matrix block copolymer are as follows.

(i) Polymer Chain Which is Compatible with "the Head Portion of the Metal-Organic Polymer Complex"

This polymer chain is not limited providing it has compatibility with the polymer protecting the metal. For finally producing a metal-organic polymer composite structure, a polymer which further suffices the condition that the supporting structure is not decomposed at room temperature is desired. It is preferred for the structural stabilization of the final porous structure that the glass transition temperature of such polymer chain is higher than room temperature (for example, poly(2-vinylpyridine) and poly(methyl methacrylate) and the like) and/or the monomer unit of the supporting polymer has a crosslinkable functional group (for example, an amino group, imino group, carboxyl group, hydroxyl group, halogen, dimethyl-propoxysilyl group and the like) so that the structure can be fixed by using the corresponding crosslinking agent (for example, poly(2-vinylpyridine) poly(dimethyl-2-propoxysilylstyrene) and the like). The number average molecular weight (Mn) of this polymer chain is not particularly limited, and may be from 1000 to 1000000. From the viewpoint of the easiness for synthesis of the polymer and the easiness for introduction of the ultrafine metal particles into the polymer, Mn of from 5000 to 500000 is preferable.

(ii) Polymer Chain Compatible with "the Tail Portion of the Metal-Polymer Complex"

The number average molecular weight (Mn) of a polymer chain for forming the phase containing the ultrafine metal particle and a polymer chain for protecting the metal is not particularly limited, and may be from 1000 to 1000000. From the viewpoint of the easiness for synthesis of the polymer and easiness for introduction of ultrafine metal particles, Mn of from 5000 to 500000 is preferable.

(3) Formation of Microphase-Separated Structure (i) Formation of Microphase-Separated Structure by Phase Separation of Matrix Block Copolymer A "metal-organic polymer complex" (most preferably, a metal-organic polymer complex in which an ultrafine metal particle is coated with a block copolymer) is mixed with the above-described matrix block copolymer, and the mixture is heated to a temperature higher than the "order-disorder transition temperature ($T_{ODT}$)" of the system or the mixture is dissolved in a common solvent for these components, to form "randomly mixed condition (disordered state)" in which all the components are all dissolved. A temperature decrease from this "disordered state" down to the $T_{ODT}$ or lower or a solvent evaporation for concentration (casting) results in a phase separation of the respective polymer chains of the matrix block copolymer to form a microphase-separated structure (most preferably, a bicontinuous structure). For forming such microphase-separated structure, homopolymers homologous to the respective polymers constituting the block copolymer may be mixed in the system. Further, a plasticizer may optionally be added to control the flexibility of the finally formed porous metal-organic polymer composite structure.

A microphase-separated structure suitable for use as a catalyst, a membrane reactor and other applications is a bicontinuous structure. For obtaining this structure, either the volume ratio of the polymer phase compatible with the metal-organic polymer complex "head portion" or the volume ratio of the polymer phase compatible with the metal-organic polymer complex "tail portion" should be about 0.33, so that a porous structure is formed from the thus obtained metal-organic polymer composite structure. For finally producing a porous metal-organic polymer composite structure from the bicontinuous metal-organic polymer composite structure, the requirements for forming a fine porous material as given in (4) below have to be sufficed.

During the step of forming the microphase-separated structure, as "the metal-organic polymer complex" (in which an ultrafine metal particle is protectively coated with a block copolymer) is composed of "the head portion" and "the tail portion" as described above, the respective portions will presumably tend to go into the compatible phases of the microphase-separated structure. However, since "the head portion" and "the tail portion" are chemically bonded, the complex can not penetrate deeply into the corresponding phases, and consequently a structure in which ultrafine metal particles are located on the interface of the phase-separated structure.

For introducing ultrafine metal particles protectively coated with a block copolymer composed of "the head portion" and "the tail portion" into the phase-separated structure from a block copolymer for use as matrix, the two block copolymers are used in a ratio which does not disturb the microphase-separated structure of the matrix polymer.

(ii) Formation of Microphase-Separated Structure from Metal-Organic Polymer Complex According to another preferred embodiment of the present invention, only by forming a microphase-separated structure from a metal-organic polymer complex itself (in which the surface of an ultrafine metal particle is coated with a block copolymer) as prepared and purified in the above-described step of (i), there is provided a metal-organic polymer composite structure composed of the phase of a metalphilic polymer containing a high amount of metal and the phase of a metalphobic polymer. For obtaining such structure, a solution or a melt is formed in which the metal-organic polymer complex coated with the block copolymer is randomly mixed (i.e. in a disordered state). In the former case, the solvent is cast (evaporated for concentration), while in the latter case the temperature is decreased down to the $T_{ODT}$ (order-disorder transition temperature) or lower. In general, simply by dissolving a metal-organic polymer complex coated with a block copolymer in a solvent and forming a cast film, a microphase-separated structure from the complex can be produced.

The type of microphase-separated structure to be produced can be controlled by the volume ratio of the "phase composed of ultrafine metal particles and a metalphilic polymer" or by the volume ratio of the "phase composed of a metalphobic polymer". The volume ratio φ of either of the two phases can be related with the type of the structure of the metal-containing phase, generally as follows : φ <0.18 for sphere, 0.18<φ<0.32 for cylinder ; 0.32<φ<0.68 for lamella, and φ up to 0.33 for producing a bicontinuous structure. The volume ratio of the metal-containing phase can be controlled to a desired value by controlling the molecular weight ratios of the respective block chains of a block copolymer used for coating the metal, or can be controlled by additionally mixing a homopolymer, an oligomer or a small molecule compatible with the phases. When such homopolymer and the like are mixed, a homopolymer or the like which is compatible with the metalphobic phase is preferably added in the preparation step in order not to decrease the metal content in the phase containing the metal. The homopolymer and the like can contribute to the pore formation by being eluted in the pore formation step as will be described below.

While this embodiment of the present invention is to obtain the composite structure by a microphase-separated structure from a metal-organic polymer complex itself (composed of an ultrafine metal particle coated with a block copolymer) without substantially using a matrix polymer, for stabilizing the phase-separated structure it is preferable to add a block copolymer, as a reinforcing material, which is the same as the block copolymer used for protectively coating the ultrafine metal particle or is compatible with such block copolymer, in a small amount so that the metal content does not decrease to 1% or lower.

While various microphase-separated structures can be produced according to the present invention, the most preferable structure as a catalyst or a membrane reactor is a bicontinuous structure, i.e. a microphase-separated structure in which the two phases composed of the "phase of a metalphilic polymer containing ultrafine metal particles" and the "phase of a metalphobic polymer (in the case of a porous material, this phase forms a pore)" respectively form continuous networks.

(4) Pore Formation

Through the above-described steps, a metal-organic polymer composite structure of the present invention is obtained. For forming a porous structure in which ultrafine metal particles are contained in the support (the phase of a metalphilic polymer) from this structure, the polymer phase not containing the ultrafine metal particles of the microphase-separated structure is removed by using a pore formation methods as described below. These pore formation methods may be utilized in combination.

(i) By selectively decomposing the polymer chain constituting the phase not containing the metal to a size of the monomer unit, a porous metal-organic polymer composite structure is obtained in which ultrafine metal particles are finally introduced into the supporting polymer. A typical polymer applicable to this method is a conjugated diene-based polymer (polybutadiene, polyisoprene and the like) which is conventionally known as the polymer to be subjected to ozonolysis. In utilizing photodecomposition, a polymer which is photodecomposable by specific wavelength absorption, such as poly(methylvinyl ketone) and the like, may be used. The number average molecular weight (Mn) of the polymer is preferably approximately the same as that of the supporting polymer for the formation of the bicontinuous structure, and can be designed depending upon the molecular weight of the support.

(ii) A homopolymer, an oligomer or a small molecule which is homologous and compatible with a metalphobic polymer (the polymer not containing ultrafine metal particles) is added to form a microphase-separated structure (particularly, a bicontinuous structure), and then, the homopolymer, oligomer or small molecule is eluted with a solvent, to form a pore.

In this case, it is not necessary that the polymer chain not containing ultrafine metal particles should be decomposable itself (although it can be decomposable), and any polymer may be applied providing it is incompatible with the supporting polymer chain which supports the ultrafine metal particles. However, since the microphase-separated structure (particularly, the bicontinuous structure) is formed where there is contained the homopolymer, oligomer or small molecule to be finally eluted, it is necessary to design that the molecular weight of the block copolymer is equal to a value calculated by subtracting the volume ratio of such additional homopolymer and the like.

(iii) In addition to the above-described methods, a method can also be used in which there is utilized a block copolymer produced by bonding two polymers at each end in a chemical bond which can be cut by an acid or a base, such as an ion bond, ester bond, amide bond and the like. After the formation of a metal-organic polymer composite structure the interpolymer bond is cut and the phase not containing ultrafine metal particles is dissolved for removal (e.g. Japanese Laid-open Patent No. 279,741/1990).

A metal-organic polymer composite structure of the present invention thus obtained has a small pore size (tens to several hundreds nm) and a large porosity of, for example, even approx. 50%.

The following examples further illustrate the features of the present invention, but do not limit the scope thereof.

EXAMPLE 1

This Example is an example of the preparation of a metal-organic polymer complex (organic polymer-protected metal cluster complex) in which an ultrafine metal particle is protectively coated with a non-water-soluble organic polymer.

EXAMPLE 1-1

To a solution of poly(2-vinylpyridine)(hereinafter, abbreviated as P2VP) (Mn(number average molecular weight) =130,000) and palladium acetylacetonate (hereinafter, abbreviated as Pd(acac)$_2$) in benzene was added n-propyl alcohol as a reducing agent in the following ratio, and the resultant mixture was heated at 85° C. for 48 hours to obtain a Pd cluster complex.

Pd(acac)$_2$ concentration=$6.6 \times 10^{-4}$ mol/l

P2VP monomer unit concentration $2.6 \times 10^{-2}$ mol/l n-propyl alcohol concentration 50% by volume The resultant metal cluster has an average particle size of 4.6 nm ±2.0 nm. The solvent was then evaporated to form a cast film composed of a poly(2-vinylpyridine) film containing metal clusters protected with uniformly dispersed poly (2-vinylpyridine).

EXAMPLE 1-2

In Example 1-1, the solution after the reaction with heating was once evaporated for drying to solid, and re-dissolved in 1,4-dioxane followed by supercentrifugal separation for 2 hours. The metal cluster protected with the polymer was precipitated as a result. The precipitate was dissolved in 1,4-dioxane and subjected to super-centrifugal separation. This sequential purifying operation was repeated for several times to obtain only the metal cluster protected with poly(2-vinylpyridine) contained therein. The protected metal cluster was stable against various dissolution, condensation, and washing operations.

EXAMPLE 1-3

In the reaction system of Example 1-1, the polymer concentration and the metal concentration were changed to form protected clusters, and the respective particle sizes were evaluated. As shown in Table 1, it is seen that the protected metal clusters having an approximately constant size irrespective of the reaction condition were obtained. In the case of protection with poly(2-vinylpyridine), the protected particle sizes were constant regardless of the difference in polymer molecular weight, as shown in Table 2.

TABLE 1

| | P2VP monomer unit concentration (mol/l) | Reaction time (hr) | | | | |
|---|---|---|---|---|---|---|
| | | 2 | 5 | 9 | 24 | 48 |
| Particle size (nm) | $2.6 \times 10^{-2}$ | 4.4 ± 2 | 4.8 ± 2 | 5.4 ± 2 | 5.0 + 2 | 4.6 + 2 |
| | $6.5 \times 10^{-3}$ | 4.8 ± 2 | 5.2 ± 2 | 5.0 ± 2 | 5.4 ± 2 | 5.6 ± 2 |

TABLE 2

| Molecular weight(Mn) | 5000 | 50000 | 135000 |
|---|---|---|---|
| Particle size(nm) | 4.6 + 2 | 5.2 + 2 | 5.0 + 2 |

EXAMPLE 1-4

To a solution of a block copolymer (hereinafter, abbreviated as P2VP-b-PI ; Mn=(20600)-b-(12600)) composed of poly(2-vinylpyridine) and polyisoprene (hereinafter, abbreviated as PI) and palladium acetylacetonate in benzene was added n-propyl alcohol as a reducing agent in the following ratio, and the resultant mixture was heated at 85° C. for 48 hours to obtain an organic polymer-protected Pd cluster complex.

Pd(acac)$_2$ concentration=$6.6 \times 10^{-4}$ mol/l

P2VP monomer unit concentration=$2.6 \times 10^{-2}$ mol/l n-propyl alcohol concentration=50% by volume The resultant metal cluster has an average particle size of 4 nm±2 nm.

EXAMPLE 1-5

The solution after the reaction in Example 1-4 was once evaporated for drying to solid, and re-dissolved in 1,4-dioxane followed by supercentrifugal separation at 50000 rpm for 2 hours, to precipitate a protected metal cluster, and the precipitate was dissolved in 1,4-dioxane and subjected to supercentrifugal separation. This sequential purifying operation was repeated for several times to obtain only metal cluster complex protected with P2VP-b-PI contained therein. The protected metal cluster thus obtained was stable also against various dissolution and condensation operations. The separated and purified protected metal cluster was then dissolved again in a solution of (P2VP-b-PI : Mn=20600-b-12600) in benzene to prepare cast film. A P2VP-b-PI film was obtained in which the protected metal clusters did not form large coagulations and were dispersed relatively uniformly.

EXAMPLE 2

This example is an example of the preparation of a porous metal-organic polymer composite structure by adding a metal-organic polymer complex (in which an ultrafine metal particle is protectively coated with a homopolymer) to a matrix polymer for forming a microphase-separated structure.

To a solution of a homopolymer of poly(2-vinylpyridine) (P2VP : Mn=50000) and palladium acetylacetonate (Pd(acac)$_2$) in benzene was added n-propyl alcohol as a reducing agent in the following ratio, and the resultant mixture was heated at 85° C. for 5 hours to obtain ultrafine Pd particles of which surfaces were protected with P2VP having an average particle size of 4.5 nm.

Pd(acac)$_2$ concentration=$6.6 \times 10^{-4}$ mol/l 2-vinylpyridine monomer unit concentration=$2.6 \times 10^{-2}$ mol/l n-propyl alcohol concentration=50% by volume The solution after the reaction was once evaporated for drying to solid, and re-dissolved in 1,4-dioxane followed by supercentrifugal separation at 50000 rpm for 2 hours for several times, so as to purify the ultrafine palladium particles protected with P2VP (abbreviated as (Pd)$_n$—P2VP). The (Pd)$_n$–P2VP and a diblock copolymer (P2VP-b-PI : Mn=23,000 to 17,000) composed of poly(2-vinylpyridine) and polyisoprene was dissolved in chloroform which is a common solvent for these compounds in the following ratio, and further, a polyisoprene homopolymer (PI : Mn=7,000) and a P2VP homopolymer (Mn=50,000) were added for controlling the composition.

Solution composition

P2VP-b-PI (Mn=23,000 to 17,000)=100 mg ((Pd)$_n$—P2VP)=0.4 mg

PI (Mn=7,000)=30 mg

P2VP (Mn=50,000)=16 mg

Solvent ; chlroform=20 ml

The solution was cast in a Teflon vessel to form a film having a bicontinuous structure composed of two phases (the thickness of each phase : tens nm) of P2VP phase containing the ((Pd)$_n$—P2VP) and the P2VP homopolymer and PI phase containing the PI homopolymer produced by the microphase-separation from the diblock copolymer (P2VP-b-PI).

This film was dried in a vacuum. Then quaternization reaction of the pyridine with 1,4-diiodobutane was conducted for the crosslinking between the pyridyl groups to fix the shape of the P2VP phase containing (Pd)$_n$—P2VP. The fixed cast film was washed with hexane to elute the PI homopolymer contained in the PI phase to form a pore through the PI phase. Further, this pore was expanded by ozonolysis of the PI chain which composes the block copolymer. As a result, there was obtained a fine porous membrane (the average pore size and the average matrix width were both tens nm) in which the Pd fine particles having a particle size of about 4 nm were fixed. The resultant fine porous structure had a Pd content of only 0.45% by weight.

EXAMPLE 3

This example is an example of the preparation of a porous metal-organic polymer composite structure by forming a microphase-separated structure from a metal-organic polymer complex in which an ultrafine metal particle is protectively coated with a block copolymer.

To a solution of a block copolymer (P2VP-b-PI) (number average molecular weight Mn=23,000 to 17,000) composed of poly(2-vinylpyridine)(P2VP) and polyisoprene (PI) and palladium acetylacetonate (Pd(acac)$_2$)in benzene was added n-propyl alcohol as a reducing agent in the following ratio, and the resultant mixture was heated at 85° C. for 50 hours to obtain a metal-organic polymer complex ((Pd)$_n$—(P2VP-b-PI)) composed of an ultrafine Pd particle of which surface was protected with P2VP-b-PI having an average particle size of 5 nm.

Pd(acac)$_2$ concentration=6.6×10$^{-4}$ mol/l 2-vinylpyridine monomer unit concentration=2.6×10$^{-2}$ mol/l n-propyl alcohol concentration=50% by volume The solution after the reaction was once evaporated for drying to solid, and re-dissolved in 1,4-dioxane followed by to supercentrifugal separation at 50000 rpm for 2 hours for several times, to purify ((Pd)$_n$—(P2VP-b-PI)). The ((Pd)$_n$—(P2VP-b-PI)) was dissolved in chloroform, and further, a polyisoprene homopolymer (PI : Mn=7,000) and a P2VP-b-PI (Mn=23,000 to 17,000) were added for controlling the composition in the following ratio.

Solution Composition

Solvent ; chloroform=100 ml ((Pd)$_n$—(P2VP-b-PI))=10 mg

P2VP-b-PI (Mn=23,000 to 17,000)=17 mg

PI (Mn=17,000)=2 mg

This solution was cast in a Teflon vessel to form a film having a bicontinuous structure in which the ((Pd)$_n$—(P2VP-b-PI)) and the diblock copolymer were microphase-separated to (Pd)$_n$—P2VP phase and PI phase (the thickness of each phase : tens nm).

This film was dried in a vacuum. Then, quaternization reaction of the pyridine with 1,4-diiodobutane was conducted for the crosslinking between the pyridyl groups to fix the shape of the phase composed of the (Pd)$_n$ and the P2VP. The fixed cast film was then washed with hexane to elute the PI homopolymer contained in the PI phase to form a pore through the PI phase. Further, this pore was expanded by ozonolysis of the PI chain which composes the block copolymer. As a result, there was obtained a fine porous membrane (the average pore size and the average matrix width were both tens nm) in which the ultrafine Pd particles having a particle size of about 5 nm were fixed. This fine porous structure had a metal Pd content of 54% by weight. A electron microphotograph of the resultant fine porous structure is shown in FIG. 5.

EXAMPLE 4

This example is an example of the preparation of a porous metal-organic polymer composite structure by adding a metal-organic polymer complex (in which an ultrafine metal particle is coated with a block copolymer) to a matrix polymer for forming a microphase-separated structure.

To a solution of a diblock copolymer (P2VP-b-PI 23,000 to 17,000) composed of poly(2-vinylpyridine)(P2VP) and polyisoprene (PI) and palladium acetylacetonate (Pd (acac) 2) in benzene was added n-propyl alcohol as a reducing agent in the following ratio, and the resultant mixture was heated at 85 C. for 50 hours to obtain a metal-organic polymer complex((Pd)$_n$—(P2VP-b-PI)) composed of an ultrafine Pd particle of which surface was protected with P2VP-b-PI having an average particle size of 5 nm.

Pd(acac)$_2$ concentration=6.6×10$^{-4}$ mol/l 2-vinylpyridine monomer unit concentration=2.6×10$^{-2}$ mol/l n-propyl alcohol concentration=50% by volume The solution after the reaction was once evaporated for drying to solid, and re-dissolved in 1,4-dioxane followed by supercentrifugal separation at 50000 rpm for 2 hours for several times, to produce (Pd)$_n$ (P2VP-b-PI). The (Pd)$_n$—(P2VP-b-PI) and a matrix polymer (P2VP-b-PI : Mn=23,000 to 17,000) were dissolved in chloroform, a common solvent for these compounds, in the following ratio. Further, a polyisoprene homopolymer (PI : Mn=7,000) was added for controlling the composition.

Solution composition

P2VP-b-PI (Mn=23,000 to 17,000)=87 mg ((Pd)$_n$—(P2VP-b-PI))=3 mg

PI (Mn=7,000)=13 mg

Solvent ; chloroform=20 ml

This solution was cast in a Teflon vessel to form a film having a bicontinuous structure composed of two phases (the thickness of each phase : tens nm) of P2VP phase containing the((Pd)$_n$—P2VP) and PI phase containing the PI homopolymer, produced by the microphase-separation from the matrix polymer (P2VP-b-PI).

This film was dried in a vacuum. Then, quaternization reaction of the pyridine with 1,4-diiodobutane was conducted for the crosslinking between the pyridyl groups to fix the shape of the P2VP phase containing the ultrafine Pd particles in the interface. The fixed cast film was washed with hexane to elute the PI homopolymer contained in the PI phase to form a pore through the PI phase. Further, this pore was expanded by ozonolysis of the PI chain which composes the block copolymer. As a result, there was obtained a fine porous membrane of P2VP (the average pore size and the average matrix width were both tens nm) in which the ultrafine Pd particles having a particle size of about 5 nm were fixed on the interface (FIG. 4).

What is claimed is:

1. A method for producing a metal-organic polymer composite structure comprising a microphase-separated structure from a block copolymer in which a metalphilic polymer chain and a metalphobic polymer chain which are incompatible with each other are bonded together at each end, wherein ultrafine metal particles having a particle size up to 10 nanometers are contained in the metalphilic polymer phase of said microphase-separated structure, comprising the steps of i) dissolving a non-water-soluble organic polymer, a solvent-soluble metal compound and a reducing agent in an organic solvent, and then heating the solution for reduction at 50 to 120° C. to produce a metal-organic polymer complex in which said ultrafine metal particle is protectively coated with the non-water-soluble organic polymer, and ii) producing a solution or a melt in which said metal-organic polymer complex and a matrix block copolymer compatible with the complex are randomly mixed, and forming a microphase-separated structure from said matrix block copolymer by a solvent casting or a decrease in temperature, thereby introducing said ultrafine metal particles into the polymer phase.

2. The method according to claim 1, further comprising, after the formation of the microphase-separated structure, the step of :

iii) removing the metalphobic polymer phase from said microphase-separated structure for pore formation, so as to obtain a porous metal-organic polymer composite structure.

3. The method according to claim 1, wherein, as the non-water-soluble organic polymer, a block copolymer is used in which a metalphilic polymer chain and a metalphobic polymer chain which are incompatible with each other are bonded together at each end, so as to obtain a metal-organic polymer composite structure in which ultrafine metal particles are located near the skeleton boundary of the polymer phase.

4. The method according to claim 3, wherein in the step of pore formation, the polymer chain forming the phase not containing ultrafine metal particles is decomposed.

5. The method according to claim 3, wherein in the step of forming the microphase-separated structure, a homopolymer, or an oligomer which is compatible with the polymer phase not containing ultrafine metal particles is added, and in the step of pore formation, said homopolymer, or oligomer or small molecule is eluted.

6. A method for producing a metal-organic polymer composite structure comprising a microphase-separated structure from a block copolymer in which a metalphilic polymer chain and a metalphobic polymer chain which are incompatible with each other are bonded together at each end, wherein ultrafine metal particles having a particle size up to 10 nanometers are contained in the metalphilic polymer phase of said microphase-separated structure, comprising the steps of i) dissolving a block copolymer in which a metalphilic polymer chain and a metalphobic polymer chain are bonded together at each end, a solvent-soluble metal compound and a reducing agent in an organic solvent, and then heating the solution for reduction at 50 to 120° C. to produce a metal-organic polymer complex in which said ultrafine metal particle is protectively coated with said block copolymer, and ii) producing a solution or a melt in which said metal-organic polymer complex is randomly mixed, and forming a microphase-separated structure from said metal-organic polymer complex by a solvent casting or a decrease in temperature.

7. The method according to claim 6, further comprising, after the formation of the microphase-separated structure, the step of:

iii) removing the metalphobic polymer phase from said microphase-separated structure for pore formation, so as to obtain a porous metal-organic polymer composite structure.

8. The method according to claim 7, wherein in the step of pore formation, the metalphobic polymer is decomposed.

9. The method according to claim 7, wherein in the step of forming the microphase-separated structure, a homopolymer, or an oligomer or a small molecule which is compatible with said metalphobic polymer is added, and in the step of pore formation, said homopolymer, or oligomer is eluted.

* * * * *